(12) United States Patent
Li et al.

(10) Patent No.: US 12,529,269 B2
(45) Date of Patent: Jan. 20, 2026

(54) THREAD FORM FOR DRILL BIT APPLICATION

(71) Applicant: Schlumberger Technology Corporation, Sugar Land, TX (US)

(72) Inventors: Haoming Li, Sugar Land, TX (US); Fei Song, Sugar Land, TX (US); Ke Li, Sugar Land, TX (US); Sayan Banerjee, Pune (IN); Ambrish Pandey, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 190 days.

(21) Appl. No.: 18/184,041

(22) Filed: Mar. 15, 2023

(65) Prior Publication Data

US 2024/0309709 A1 Sep. 19, 2024

(51) Int. Cl.
*E21B 17/042* (2006.01)
*F16L 15/00* (2006.01)
*F16L 15/06* (2006.01)

(52) U.S. Cl.
CPC .......... *E21B 17/042* (2013.01); *F16L 15/001* (2013.01); *F16L 15/06* (2013.01)

(58) Field of Classification Search
CPC ....... F16L 15/06; F16L 15/001; F16L 15/006; E21B 17/042
See application file for complete search history.

(56) References Cited

U.S. PATENT DOCUMENTS

| | | |
|---|---|---|
| 3,201,964 A | 8/1965 | Fritz |
| 3,953,996 A | 5/1976 | Chernock |
| 3,996,780 A | 12/1976 | German |
| 4,411,147 A | 10/1983 | Capuano |
| 4,549,754 A | 10/1985 | Saunders |
| 4,687,368 A * | 8/1987 | Eklof ............ F16L 15/006 285/334 |

(Continued)

FOREIGN PATENT DOCUMENTS

| | | |
|---|---|---|
| CN | 201768860 U | 3/2011 |
| CN | 201865594 U | 6/2011 |

(Continued)

OTHER PUBLICATIONS

International Search Report and Written Opinion issued in International Patent application PCT/US2015/035527 on Aug. 26, 2015. 13 pages.

(Continued)

*Primary Examiner* — David Bochna
(74) *Attorney, Agent, or Firm* — Jeffrey D. Frantz

(57) ABSTRACT

A drill bit includes a first tubular member including a pin end and a second tubular member including a box end. Each of the first tubular member and the second tubular member includes a respective thread structure that has, respectively, a crest extending between a top edge of a respective first flank and a top edge of a respective second flank, and a root extending between a bottom edge of the respective first flank and a bottom edge of a respective adjacent thread turn. A width of the root of the box end is less than a width of the root of the pin end such that, when the pin end and the box end are threadedly connected, the box thread structure experiences reduced maximum stress and plastic strain to prevent stripping under high torque or high tension.

18 Claims, 6 Drawing Sheets

(56) References Cited

U.S. PATENT DOCUMENTS

| | | | |
|---|---|---|---|
| 4,692,988 A * | 9/1987 | Shulver | E21B 17/042 285/94 |
| 4,716,751 A | 1/1988 | Wozniak | |
| 4,799,844 A | 1/1989 | Chuang | |
| 4,861,210 A | 8/1989 | Frerejacques | |
| 5,056,611 A | 10/1991 | Yousef | |
| 5,163,523 A | 11/1992 | Yousef | |
| 5,427,418 A | 6/1995 | Watts | |
| 5,931,511 A * | 8/1999 | DeLange | E21B 17/042 285/333 |
| 6,030,004 A | 2/2000 | Schock | |
| 6,196,598 B1 | 3/2001 | Yao | |
| 6,447,025 B1 | 9/2002 | Smith | |
| 6,467,818 B1 | 10/2002 | Snapp | |
| 6,729,658 B2 | 5/2004 | Verdillon | |
| 6,799,664 B1 | 10/2004 | Connolly | |
| 7,078,623 B1 | 7/2006 | Sheehan | |
| 7,188,685 B2 | 3/2007 | Downton | |
| 7,210,710 B2 | 5/2007 | Williamson | |
| 7,416,374 B2 | 8/2008 | Breihan | |
| 7,455,329 B2 | 11/2008 | Muradov | |
| 8,763,725 B2 | 7/2014 | Downton | |
| 10,145,496 B2 | 12/2018 | Li | |
| 10,662,722 B2 | 5/2020 | Gan | |
| 2002/0113436 A1 | 8/2002 | Verdillon | |
| 2005/0189147 A1 | 9/2005 | Williamson | |
| 2006/0214421 A1 | 9/2006 | Muradov | |
| 2007/0131412 A1 | 6/2007 | Finci | |
| 2007/0286694 A1 | 12/2007 | Glimpel | |
| 2008/0012321 A1 * | 1/2008 | Roussie | E21B 17/042 285/334 |
| 2010/0018699 A1 | 1/2010 | Hall | |
| 2010/0123311 A1 | 5/2010 | Church | |
| 2010/0308577 A1 | 12/2010 | Chin | |
| 2011/0012347 A1 | 1/2011 | Pacheco | |
| 2012/0195713 A1 * | 8/2012 | Gu | F16L 15/06 411/411 |
| 2014/0165352 A1 | 6/2014 | Belpanno | |
| 2014/0333065 A1 | 11/2014 | Pacheco | |
| 2015/0362100 A1 | 12/2015 | Li | |
| 2015/0367402 A1 | 12/2015 | Singh | |
| 2016/0136721 A1 | 5/2016 | Zhou | |
| 2016/0161030 A1 * | 6/2016 | Liu | E21B 17/042 285/390 |
| 2019/0060979 A1 | 2/2019 | Singh | |
| 2019/0078398 A1 | 3/2019 | Gan | |
| 2020/0115965 A1 * | 4/2020 | Pacheco | E21B 17/042 |

FOREIGN PATENT DOCUMENTS

| | | |
|---|---|---|
| EP | 2606992 A1 | 6/2013 |
| JP | H10238548 A | 9/1998 |
| KR | 1020120131020 A | 12/2012 |

OTHER PUBLICATIONS

International Preliminary Report on Patentability issued in International Patent application PCT/US2015/035527, dated Jan. 5, 2017. 12 pages.

International Search Report and Written Opinion issued in International Patent application PCT/US2015/035451 on Sep. 23, 2015. 16 pages.

International Preliminary Report on Patentability issued in International Patent application PCT/US2015/035451, dated Dec. 22, 2016. 14 pages.

First Office Action and Search Report issued in Chinese Patent Application 201580034196.9 on Jan. 3, 2018. 13 pages.

First Office Action and Search Report issued in Chinese Patent Application 201580031589.4 on Feb. 2, 2018. 8 pages.

Second Office Action issued in Chinese Patent Application 201580031589.4 on Sep. 30, 2018, 6 pages, includes English Translation.

Office Action issued in U.S. Appl. No. 14/737,451 on Aug. 29, 2017. 8 pages.

Office Action issued in U.S. Appl. No. 14/737,443 on Sep. 21, 2017. 6 pages.

"Specification for Rotary Drill Stem Elements," ANSI/API Specification 7-1, Mar. 2006.

Office Action issued in U.S. Appl. No. 16/191,110 on Jun. 13, 2019, 9 pages.

Office Action issued in U.S. Appl. No. 16/173,923 on Mar. 1, 2021, 13 pages.

Office Action issued in U.S. Appl. No. 16/173,923 on Aug. 27, 2021, 23 pages.

Trishman, I.E., Method for the Improvement of Drill-collar Joints Evaluated by Full-size Fatigue Tests. Drilling and Production Practice, American Petroleum Institute, Jan. 1, 1952. New York, New York. 14 pages.

Office Action issued in U.S. Appl. No. 16/173,923 on Dec. 24, 2021, 8 pages.

* cited by examiner

504

502

500

THREAD FORM FOR DRILL BIT APPLICATION

BACKGROUND

During natural resource production, a wellbore may be drilled into the ground. At one or more points along the wellbore a subsurface fluid may be encountered (e.g., hydrocarbon, water, etc.).

Drill bit thread connections often need to be made upon the rig, which requires a thread to have a taper. The thread sometimes is subjected to high makeup torques (both on rig and/or at downhole). When under high torque or high tension, either during assembly or downhole, the connection thread may strip.

SUMMARY

In general, embodiments of the disclosure describe a drill bit, comprising: a first tubular member comprising a pin end and a pin thread structure extending helically along an outer surface of the pin end in spaced thread turns, the pin thread structure comprising: a first pin flank and a second pin flank; a pin crest extending between a top edge of the first pin flank and a top edge of the second pin flank; and a pin root extending between a bottom edge of the first flank and a bottom edge of a flank of an adjacent thread turn. The drill bit also comprises a second tubular member comprising a box end and a box thread structure extending helically along an inner surface of the box end in spaced thread turns, the box thread structure comprising: a first box flank and a second box flank; a box crest extending between a top edge of the first box flank and a top edge of the second box flank; and a box root extending between a bottom edge of the first box flank and a bottom edge of a box flank of an adjacent thread turn, wherein the pin end and the box end are threadedly connected and a width of the box root is less than a width of the pin root.

In general, embodiments of the disclosure describe a downhole drilling assembly comprising: a plurality of pipe sections, each of the plurality of pipe sections comprising: a first pipe comprising a pin end and a pin thread structure extending helically along an outer surface of the pin end in spaced thread turns, the pin thread structure comprising: a first pin flank and a second pin flank; a pin crest extending between a top edge of the first pin flank and a top edge of the second pin flank; and a pin root extending between a bottom edge of the first flank and a bottom edge of a flank of an adjacent thread turn; and a second pipe comprising a box end and a box thread structure extending helically along an inner surface of the box end in spaced thread turns, the box thread structure comprising: a first box flank and a second box flank; a box crest extending between a top edge of the first box flank and a top edge of the second box flank; and a box root extending between a bottom edge of the first box flank and a bottom edge of a box flank of an adjacent thread turn, wherein the pin end and the box end are threadedly connected and a width of the box root is less than a width of the pin root.

In general, embodiments of the disclosure describe a method of manufacturing a thread form for a bit connection, comprising applying a material to a mold; positioning at least one material in the mold; sintering the at least one material; and machining a thread structure into a bit using the thread form, wherein the thread form includes a pin root extending higher into a box root resulting in an increased contact surface and shearing area.

Other aspects will be apparent from the following description and the appended claims.

BRIEF DESCRIPTION OF DRAWINGS

Like elements in the various figures are denoted by like reference numerals for consistency.

DETAILED DESCRIPTION

Figure 1:
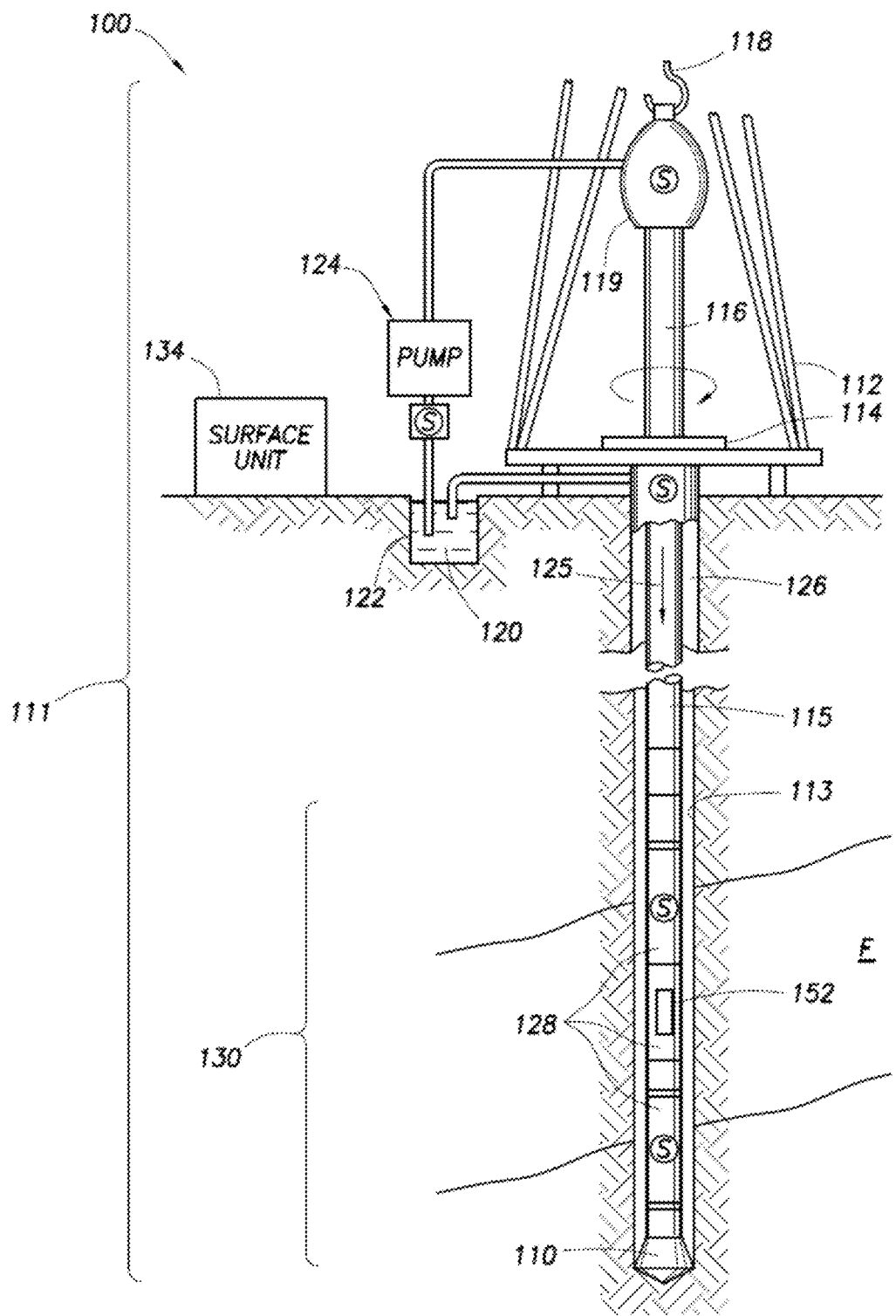
FIG. 1 shows a schematic view of a wellsite depicting a drilling operation, in accordance with one or more embodiments.

Specific embodiments of the disclosure will now be described in detail with reference to the accompanying figures. Like elements in the various figures are denoted by like reference numerals for consistency.

This disclosure describes a new bit thread design that can withstand high makeup torque while still allowing on rig makeup. For some drill bit applications, the box material (Matrix) is weaker than pin material. This difference in strength may lead to box thread stripping under high torque or high tension. The new thread design described in this disclosure accommodates the situation by using different thread profiles/forms for box and pin connections. The design allows the pin thread to extend higher into the box thread root, so as to have larger contact surface and more shearing area, which enhances box thread connections. Because this is a downhole thread for drilling application, the thread profile follows the general practices for standard American Petroleum Institute (API) threads, such as tapered thread which is critical for on rig makeup, and box pin thread interaction is controlled by the thread diameters at a gauge point with no gap at a non-minor dimension.

FIG. 1 is a schematic view of a wellsite (100) depicting a drilling operation. In one or more embodiments, drilling tools are deployed from rigs for subsurface fluid (hydrocarbons, water, etc.) extraction. The drilling tools advanced into the earth along a path to locate reservoirs containing the valuable downhole assets.

Fluid, such as drilling mud or other drilling fluids, is pumped down the wellbore (or borehole) through the drilling tool and out the drilling bit. In one or more embodiments, the amount of fluid pumped into the well is defined by the drilling density. Specifically, the drilling density is the upper and lower bounds of equivalent hydraulic pressure acting over borehole walls to create failure of the borehole. Because the amount and type of fluid directly affect the hydraulic pressure on the borehole walls, calculating the drilling density and using the drilling density defines the amount and type of fluid to pump down the wellbore. Continuing with the discussion of FIG. 1, the drilling fluid flows through the annulus between the drilling tool and the wellbore and out the surface, carrying away earth loosened during drilling. The drilling fluids return the earth to the surface and seal the wall of the wellbore to prevent fluid in the surrounding earth from entering the wellbore and causing a 'blow out'.

During the drilling operation, the drilling tool may perform downhole measurements to investigate downhole conditions. The drilling tool may be used to take core samples of subsurface formations. In some cases, the drilling tool is removed, and a wireline tool is deployed into the wellbore to perform additional downhole testing, such as logging or sampling. Steel casing may be run into the well to a desired depth and cemented into place along the wellbore wall. Drilling may be continued until the desired total depth is reached.

A formation is in an underground geological region. An underground geological region is a geographic area that exists below land or ocean. In one or more embodiments, the underground geological region includes the subsurface formation in which a borehole is or may be drilled and any subsurface region that may affect the drilling of the borehole, such as because of stresses and strains existing in the subsurface region. In other words, the underground geological region may not only include the area immediately surrounding a borehole or where a borehole may be drilled, but also any area that affects or may affect the borehole or where the borehole may be drilled.

FIG. 1 depicts a wellsite system (100) including a drilling system (111) and a surface unit (134). In the illustrated embodiment, a borehole (113) is formed by rotary drilling in a manner that is well known. Although rotary drilling is shown, embodiments also include drilling applications other than conventional rotary drilling (e.g., mud-motor based directional drilling), and is not limited to land-based rigs. For example, embodiments may be used for the drilling of a deep-water operation.

The drilling system (111) includes a drill string (115) suspended within the borehole (113) with a drill bit (110) at its lower end. The drill bit is attached to the drill string (115) by a threaded connection. Some of the drill bits have a box made of Matrix material which is weaker than most of the pin connection material, such as 140 ksi non-mag drill collar material or 120 ksi Inconel 718. If the thread form follows the standard API design practices, the box thread is much weaker than the pin.

The drilling system (111) also includes the land-based platform and derrick assembly (112) positioned over the borehole (113) penetrating a subsurface formation (F). The assembly (112) includes a rotary table (114), kelly (116), hook (118) and rotary swivel (119). The drill string (115) is rotated by the rotary table (114), energized by means not shown, which engages the kelly (116) at the upper end of the drill string. The drill string (115) may be suspended from hook (118), attached to a traveling block (also not shown), through the kelly (116) and a rotary swivel (119) which permits rotation of the drill string relative to the hook.

The drilling system (111) further includes drilling fluid or mud (120) stored in a pit (122) formed at the well site. A pump (124) delivers the drilling fluid (120) to the interior of the drill string (115) via a port in the swivel (119), inducing the drilling fluid to flow downwardly through the drill string (115) as indicated by the directional arrow (125). The drilling fluid exits the drill string (115) via ports in the drill bit (110), and then circulates upwardly through the region between the outside of the drill string and the wall of the borehole, called the annulus (126). In this manner, the drilling fluid lubricates the drill bit (110) and carries formation cuttings up to the surface as it is returned to the pit (122) for recirculation.

The drill string (115) further includes a bottom hole assembly (BHA), generally referred to as (130), near the drill bit (110) (in other words, within several drill collar lengths from the drill bit). The bottom hole assembly (130) includes capabilities for measuring, processing, and storing information, as well as communicating with the surface unit. The BHA (130) further includes drill collars (128) for performing various other measurement functions.

Downhole sensors or gauges (S) are disposed about the drilling tool and/or wellbore to provide information about downhole conditions, such as wellbore pressure, weight on bit, torque on bit, direction, inclination, collar rpm, tool temperature, annular temperature, and toolface, among others. The information collected by the sensors and cameras is conveyed to the various parts of the drilling system and/or the surface control unit.

The drilling system (111) is operatively connected to the surface unit (134) for communication therewith. The BHA (130) is provided with a communication subassembly (152) that communicates with the surface unit (134). The communication subassembly (152) is adapted to send signals to and receive signals from the surface using mud pulse telemetry.

Embodiments of the disclosure describe a new thread design for drill bit application. Some of the drill bits have a box made of Matrix material which is weaker than most of the pin connection material. If the thread form follows the standard API design practices, the box thread is much weaker than the pin. When under high torque or high tension, either during assembly or downhole, the box thread may strip. Embodiments of the disclosure addresses this issue by designing the box thread and pin thread with different thread profiles to accommodate weaker box material. Unlike standard API threads, which have the same thread form for pin and box, the box thread of embodiments of the disclosure is deeper with a smaller root.

Figure 2:
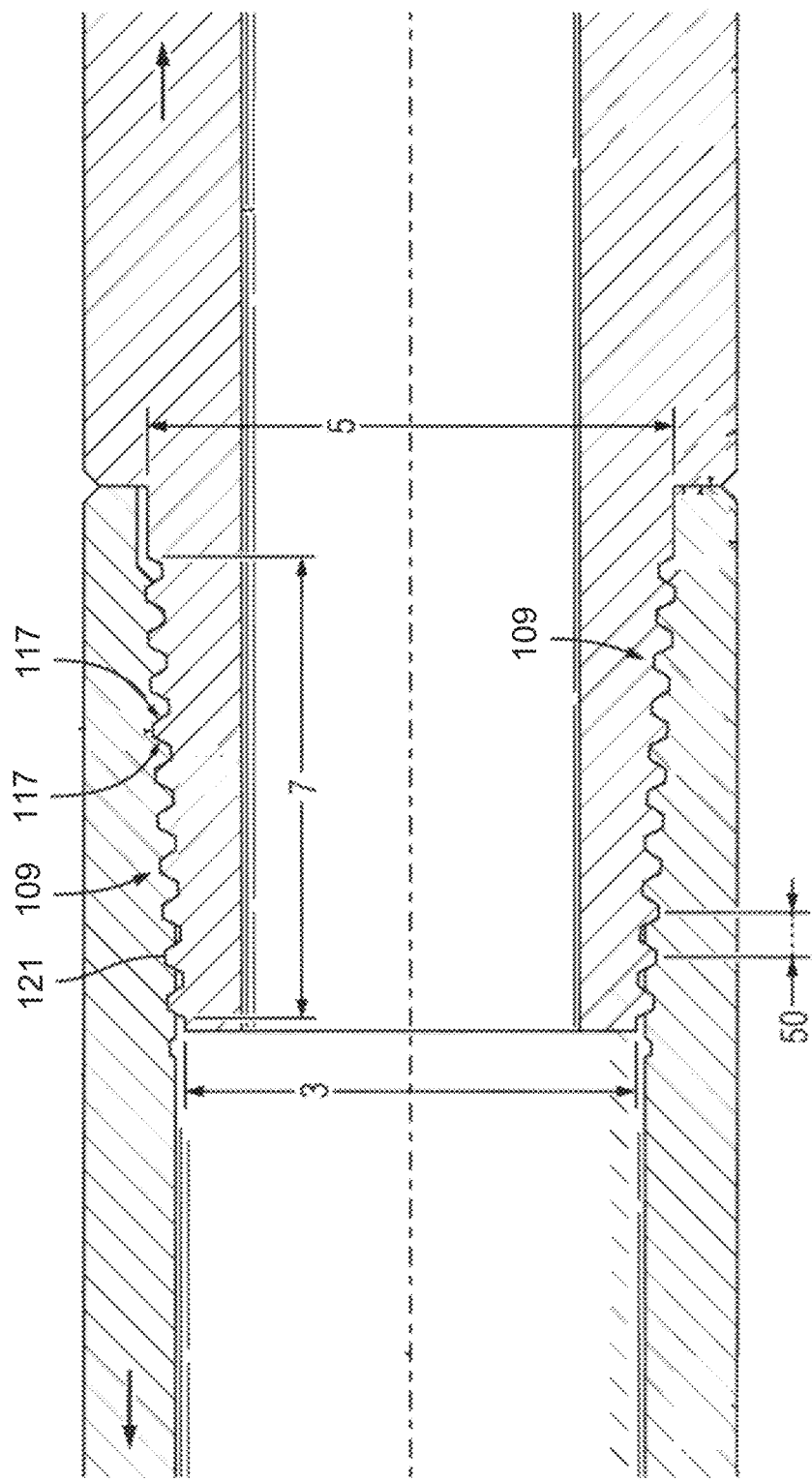
FIG. 2 shows a cross-sectional view illustrating a rotary shouldered connection, in accordance with one or more embodiments.
Figure 3:
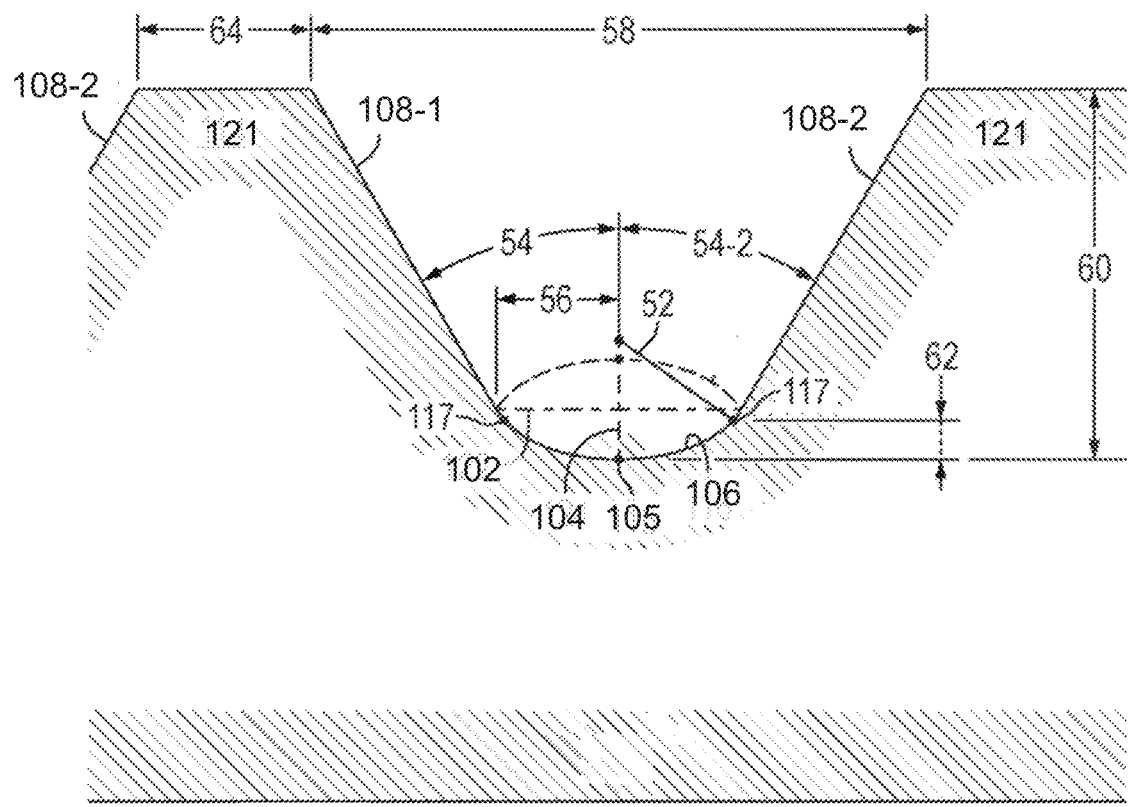
FIG. 3 shows a profile view of a thread structure and a thread root, in accordance with one or more embodiments.
Figure 4:
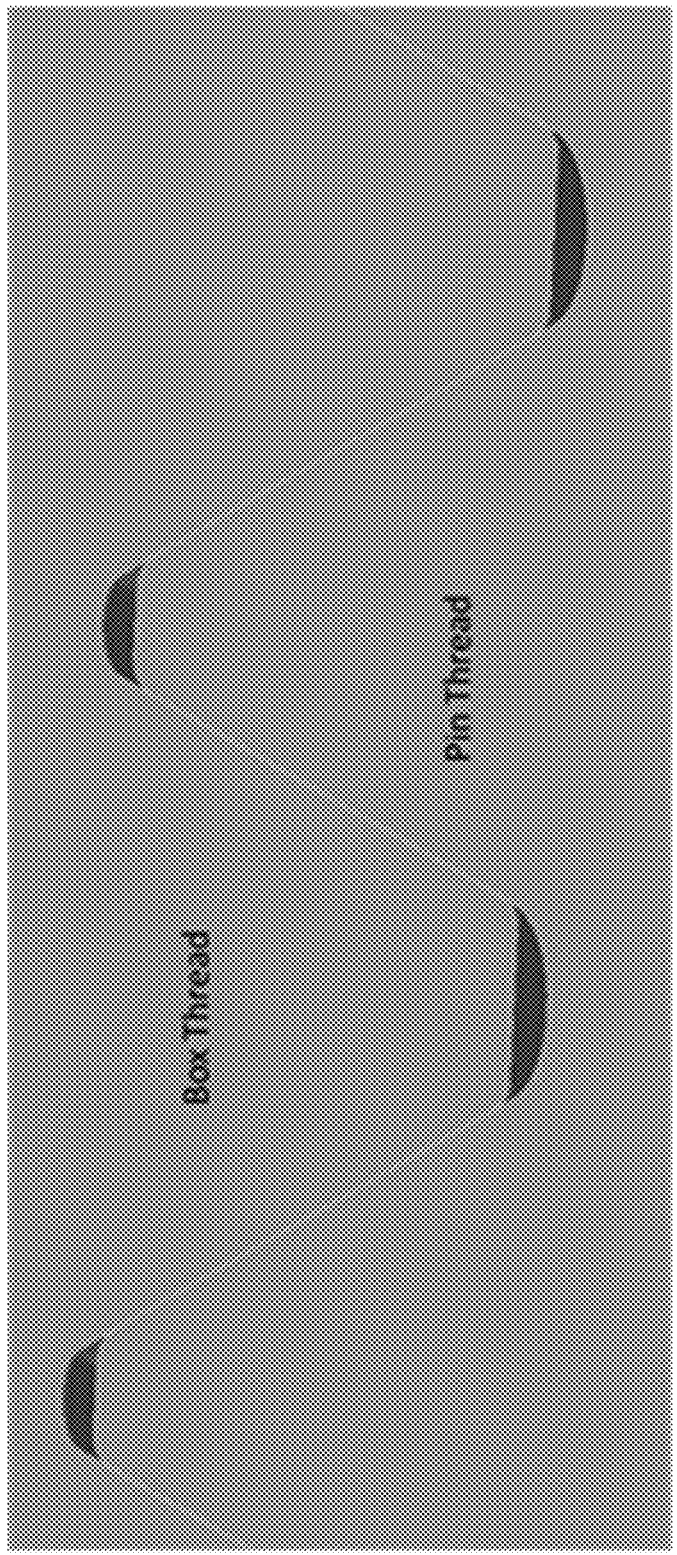
FIG. 4 shows a box thread and a pin thread, in accordance with one or more embodiments.
Figure 4:

With reference to FIG. 2 and FIG. 3, in accordance with embodiment of the disclosure, thread structure (109) includes the thread parameters described in Table 1 below. For reference, in according with embodiments of the disclosure, FIG. 4 shows API style thread (400) with different box thread and pin thread root forms. In particular, unlike standard API threads, that have the same thread form for pin and box, the box thread (400) of FIG. 4 is deeper with a smaller root.

TABLE 1

| Name | Symbol | Reference No. |
| --- | --- | --- |
| Pitch |  | 50 (FIG. 2) |
| Equivalent Root Radius | R | 52 (FIG. 3) |
| Flank Angle | FA | 54 and 54-2 (FIG. 3) |
| Root Semi-Width at Flank | SW (SW = Rcos(FA)) | 56 (FIG. 3) |
| Transition Point | TP | 117 (FIG. 3) |
| Root Width at Crest | RW (RW = Pitch − (Crest Width)) | 58 (FIG. 3) |
| Truncated Thread Height | TH (TH − [RW/ 2 − Rcos(FA)]/ tan(FA) + RD) | 60 (FIG. 3) |
| Root Depth between Flank Transition Points (117) and Root Bottom (105) | RD | 62 (FIG. 3) |
| Crest Width |  | 64 (FIG. 3) |

In accordance with some aspects, the root portion (106) in the thread structure (109) has an equivalent root radius (52)

defined by a portion of an ellipse (66), tangentially adjoining the two flanks (108-1 and 108-2) of the adjacent threads (121), see e.g., FIG. 3. Further, the root bottom (105) is located at the lowest point of the root portion (106). A summary of non-limiting examples of primary thread parameters of thread structures (109) in accordance with one or more embodiments are listed below and in Table 2.

In embodiments of the disclosure, the preferred thread design parameters and working ranges include: pitch diameter—depends on the application diameter; in particular, for seven inch drill bit, the range is 3.9"~4.5", prefer 4.387"; taper: >0 and <1.75 in/ft, prefer 1.25 in/ft; pitch: 3~6.35 threads per inch, prefer 4; thread Angle: 20~35°, prefer 30°.

TABLE 2

| | |
|---|---|
| Equivalent Root Radius (52) | ~0.005 to ~0.061 inch |
| Flank Angle (54) | ~20° to ~35° |
| Crest Width (64) | ~0.015 to ~0.2 inch |
| Root Depth (62) | ~0.005 to ~0.05 inch |
| Taper (in/ft) | >0 and <1.75 |
| Pitch (thread/in) (50) | 3~6.35 |

FIG. 2 and FIG. 3 show an embodiment of a thread and/or one or more threaded connection between one or more tubular components of a drilling system (111) as shown and described in reference to FIG. 1. In other embodiments, a thread and/or threaded connection according to the disclosure may connect a bit (110) to another downhole component of a drilling system (111).

In accordance with one or more aspects, the thread structure (109) may have an equivalent root radius (52) of about 0.005 inch to about 0.061 inch, a flank angle (54) of about 20 to about 35 degrees, a crest width (64) of about 0.015 to about 0.2 inch, and a root depth (62) of about 0.005 to about 0.05 inch. The thread structure (109) may have a root semi-width (56) at flank transitions points of about 0.050 to about 0.060, a pitch (50) of about three threads to 6.35 threads per inch, and a taper of about >0 to about >1.75 taper per foot. The major axis (102) may have a semi-major axis length for example of about 0.050 inch to about 0.055 inch and a semi-minor axis (104) length of about 0.013 to about 0.020 inch.

In accordance with one or more embodiments, a thread structure (109) has a tangential elliptical root portion (106) geometry with an equivalent root radius of about 0.057 inch to about 0.061 inch, a flank angle of about 25 to about 27.5 degrees, and a root depth of about 0.014 to about 0.016 inch.

The thread form ratio details are as follows in accordance with one or more embodiments. The box thread and the pin thread have different thread forms in accordance with the invention. The addendum over dedendum ratios is about 2:3 for the box thread and about 3:2 for the pin thread and the pin crest width is about one-half the box crest. Embodiments of the design allows the pin to engage with the box to a higher point so to lead to more shearing area for the box with weaker material. Different from the straight thread used on some of the drill bit, the thread profile has a taper to allow on-rig makeup. The design also follows the API thread profile practice that the box and pin are controlled by the thread diameters at a gauge point with no gap designed at a nominal condition.

Figure 5:
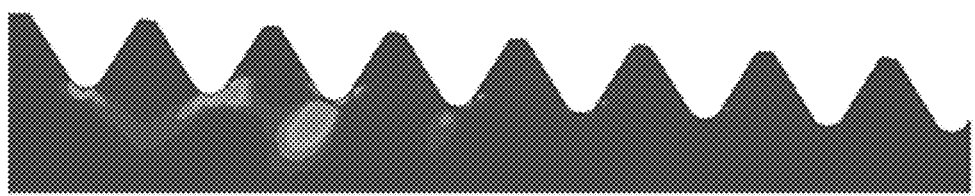
FIG. 5 shows a strain comparison among these three designs when under the same makeup torque and same tension, in accordance with one or more embodiments.
Figure 5:
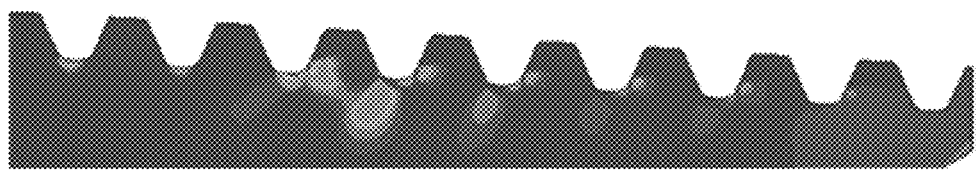
Figure 5:
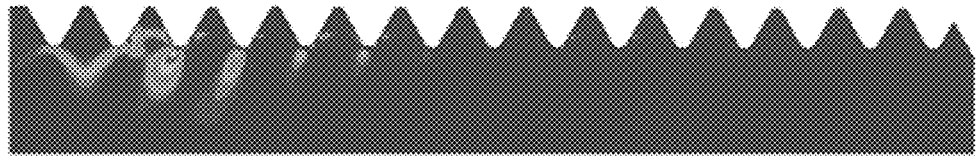

FIG. 5 is a box thread strain comparison among a first design (500), a second design (502), and a third design (504) when under the same makeup torque and same tension. As seen from FIG. 5, the third design (504) has less maximum stress and less plastic strain comparing with the first design (500) and the second design (502), which both have more maximum stress and more plastic strain indicating a likelihood of the box thread stripping. The less maximum stress and strain is a result of a new thread design that has different thread forms for box and pin connections while the thread profiles are controlled by thread diameters at gage point, same as standard API threads. The TPI (thread per inch) of the thread could be 3 or more than 3, and not necessarily an integer depending on the application. The thread design is advantageous for drill bit application where box uses a weaker material than the pin. The tapered thread design also allows on rig makeup. Although the thread was developed for drill bit application, one skilled in the art would appreciate that the thread may be used for other applications when the box thread is weaker than the pin.

Figure 6:
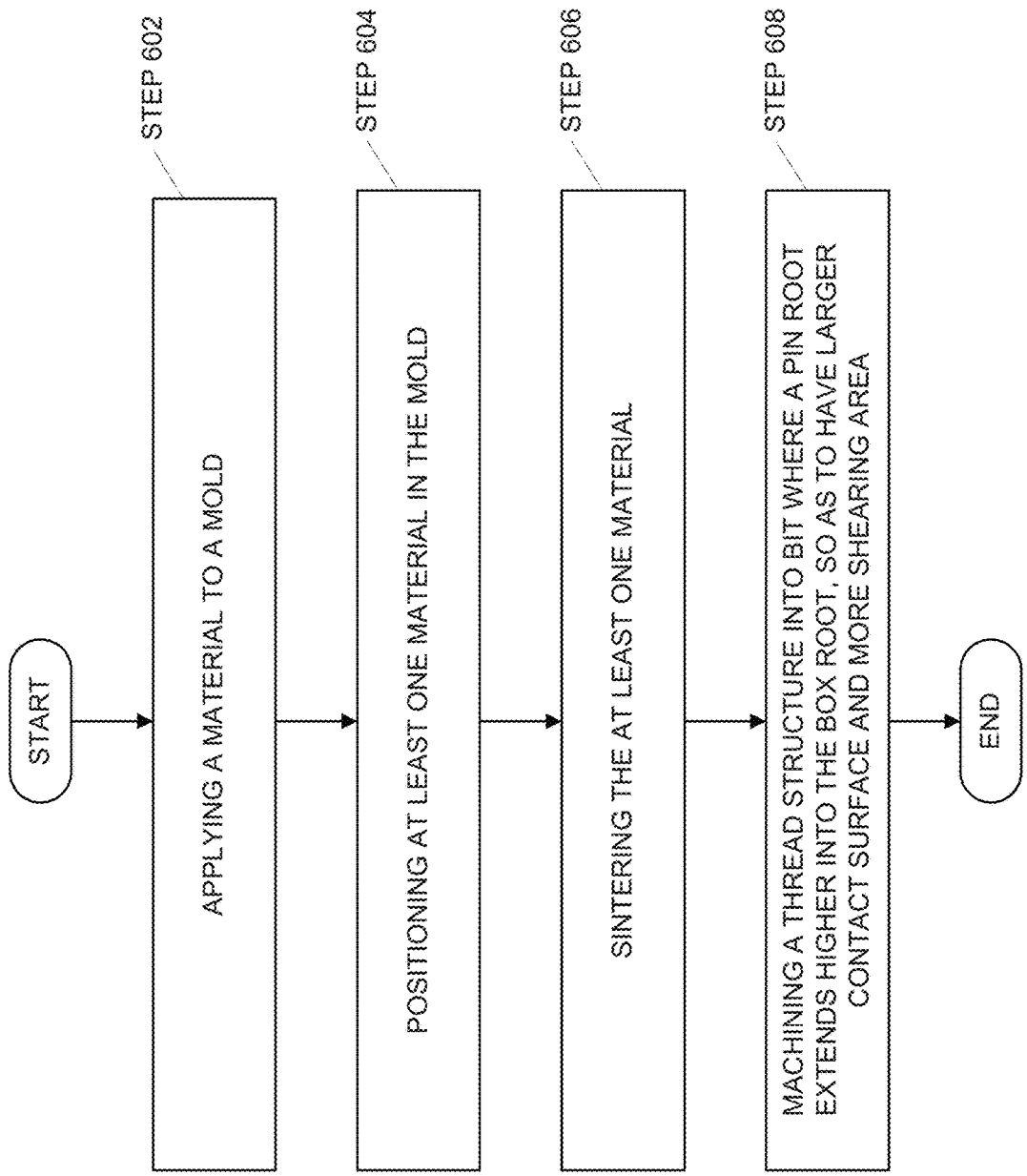
FIG. 6 shows a flow chart of a method of manufacturing a thread form for a bit connection, in accordance with one or more embodiments.

FIG. 6 is a flowchart depicting an embodiment of a method of manufacturing a bit, such as the bit (110) of FIG. 1. In some embodiments, a method manufacturing of the bit is performed by applying a gauge material as a paste/putty to the gauge pad regions of a mold at Step 602. A powder, fluid, mixture, or other precursor material may then be then positioned in the mold at Step 604. In some embodiments, a series of precursor materials (e.g., powders) may be layered into the mold. For example, the series of precursor materials may be layered at least partially in a blade region of the mold, and the additional series of precursor materials is placed on top of the precursor powder, up to the plenum of the bit. A series of precursor material that is a powder may then fill the remainder of the mold. Infiltration binder materials may also be included to melt and infiltrate the precursor material(s) of the bit during the sintering process (e.g., the process of compacting and forming a solid mass of material by pressure or heat without melting it to the point of liquefaction).

In some embodiments, the method further includes sintering the gauge material and the at least one precursor material at Step 606. In some embodiments, sintering the at least one precursor includes sintering at a sintering temperature greater than 500° C. In the same or other embodiments, sintering the at least one precursor includes sintering at a sintering temperature greater than 700° C. In yet the same or additional embodiments, sintering the at least one precursor includes sintering at a sintering temperature greater than 1000° C.

In some embodiments, the at least one precursor material forms a machinable, hard matrix when infiltrated and sintered, and the thread structure is machined after the bit body is infiltrated at Step 708. The thread structure machined into the machinable, hard matrix may include one or more aspects of the embodiments of a thread structure described herein, including thread forms described with respect to FIG. 2, FIG. 3, and FIG. 4.

In the above detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

One or more specific embodiments of the present disclosure are described herein. These described embodiments are examples of the presently disclosed techniques. Additionally, in an effort to provide a concise description of these embodiments, not all features of an actual embodiment may be described in the specification.

Additionally, it should be understood that references to a stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The use of "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about" or "approximately" the stated value, as would be appreciated by one of ordinary skill in the art encompassed by embodiments of the present disclosure.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For example, two angles may be "about congruent" if the values of the two angles are within a first predetermined range of angles for one embodiment, but also may be "about congruent" if the values of the two angles are within a second predetermined range of angles for another embodiment. The ordinary artisan is capable of assessing what is an acceptable engineering tolerance for a particular product, and thus is capable of assessing how to determine the variance of measurement contemplated by the term "about."

As used herein, the term "connected to" contemplates at least two meanings, unless stated otherwise. In a first meaning, "connected to" means that component A was, at least at some point, separate from component B, but then was later joined to component B in either a fixed or a removably attached arrangement. In a second meaning, "connected to" means that component A could have been integrally formed with component B. Thus, for example, a bottom of a pan is "connected to" a wall of the pan. The term "connected to" may be interpreted as the bottom and the wall being separate components that are snapped together, welded, or are otherwise fixedly or removably attached to each other. However, the bottom and the wall may be deemed "connected" when formed contiguously together as a monocoque body.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of vibrational sensors. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an inclusive "or" and, as such includes "and." Further, items joined by an or may include any combination of the items with any number of each item unless expressly stated otherwise.

In the above description, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope as disclosed herein. Accordingly, the scope should be limited only by the attached claims.

What is claimed is:

1. A drill bit, comprising:
a first tubular member comprising a pin end and a tapered pin thread structure extending helically along an outer surface of the pin end in spaced thread turns, the tapered pin thread structure comprising:
a first pin flank and a second pin flank;
a pin crest extending between a top edge of the first pin flank and a top edge of the second pin flank; and
a pin root extending between a bottom edge of the first pin flank and a bottom edge of a third pin flank of an adjacent pin thread turn, wherein a profile of the pin root is defined by a portion of a pin root ellipse that is tangential to the first pin flank and to the pin flank of the adjacent pin thread turn; and
a second tubular member comprising a box end and a tapered box thread structure extending helically along an inner surface of the box end in spaced thread turns, the tapered box thread structure comprising:
a first box flank and a second box flank;
a box crest extending between a top edge of the first box flank and a top edge of the second box flank; and
a box root extending between a bottom edge of the first box flank and a bottom edge of a box flank of an adjacent box thread turn, wherein a profile of the box root is defined by a portion of a box root ellipse that is tangential to the first box flank and to the box flank of the adjacent box thread turn,
wherein the pin end and the box end are threadedly connected and a width of the box root is less than a width of the pin root.

2. The drill bit of claim 1, wherein the pin crest has a width less than a width of the box crest.

3. The drill bit of claim 1, wherein the box root has an equivalent root radius between about 0.005 inches and about 0.061 inches, and a root depth between about 0.005 inches and about 0.05 inches.

4. The drill bit of claim 3, wherein the box root has a width approximately one half of the width of the pin root.

5. The drill bit of claim 1, wherein the tapered box thread structure has an addendum over dedendum ratio of approximately equal to 2:3.

6. The drill bit of claim 5, wherein the tapered pin thread structure has an addendum over dedendum ratio of approximately equal to 3:2.

7. The drill bit of claim 3, wherein the first box flank and the second box flank each have a flank angle of about 20 degrees to about 35 degrees.

8. The drill bit of claim 7, wherein the box root ellipse that is tangential to the first box flank and to the box flank of the adjacent box thread turn has a semi-major axis length of about 0.050 inches to about 0.055 inches and a semi-minor axis length of about 0.013 inches to about 0.020 inches.

9. The drill bit of claim 1, further comprising:
a box pin thread interaction controlled by thread diameters at a gauge point with no gap at a non-minor dimension.

10. A downhole drilling assembly comprising:
a plurality of pipe sections, each of the plurality of pipe sections comprising:
a first pipe comprising a pin end and a tapered pin thread structure extending helically along an outer surface of the pin end in spaced thread turns, the tapered pin thread structure comprising:
a first pin flank and a second pin flank;
a pin crest extending between a top edge of the first pin flank and a top edge of the second pin flank; and
a pin root extending between a bottom edge of the first pin flank and a bottom edge of a third pin flank of an adjacent pin thread turn, wherein a profile of the pin root is defined by a portion of a pin root ellipse that is tangential to the first pin flank and to the pin flank of the adjacent pin thread turn; and
a second pipe comprising a box end and a tapered box thread structure extending helically along an inner surface of the box end in spaced thread turns, the tapered box thread structure comprising:
a first box flank and a second box flank;
a box crest extending between a top edge of the first box flank and a top edge of the second box flank; and
a box root extending between a bottom edge of the first box flank and a bottom edge of a box flank of an adjacent box thread turn, wherein a profile of the box root is defined by a portion of a box root ellipse that is tangential to the first box flank and to the box flank of the adjacent box thread turn,
wherein the pin end and the box end are threadedly connected and a width of the box root is less than a width of the pin root.

11. The downhole drilling assembly of claim 10, wherein the pin crest has a width less than a width of the box crest.

12. The downhole drilling assembly of claim 10, wherein the box root has an equivalent root radius between about 0.005 and about 0.061 inches, and a root depth between about 0.005 inches and about 0.05 inches.

13. The downhole drilling assembly of claim 12, wherein the box root has a width approximately one half of the width of the pin root.

14. The downhole drilling assembly of claim 12, wherein the first box flank and the second box flank each have a flank angle of about 20 degrees to about 35 degrees.

15. The downhole drilling assembly of claim 14, wherein the box root ellipse that is tangential to the first box flank and to the box flank of the adjacent box thread turn has a semi-major axis length of about 0.050 inches to about 0.055 inches and a semi-minor axis length of about 0.013 inches to about 0.020 inches.

16. The downhole drilling assembly of claim 10, wherein an addendum over dedendum ratio of the tapered box thread structure is approximately equal to 2:3.

17. The downhole drilling assembly of claim 16, wherein an addendum over dedendum ratio of the tapered pin thread structure is approximately equal to 3:2.

18. The downhole drilling assembly of claim 10, wherein a box material of the box end and of the tapered box thread structure is weaker than a pin material of the pin end and of the tapered pin thread structure.

* * * * *